T. CHADWICK.
Portable Furnace.

No. 100,117.  Patented Feb. 22, 1870.

WITNESSES:
L. P. Driver
J. S. Husband

INVENTOR.
T. Chadwick.

United States Patent Office.

THOMAS CHADWICK, OF NEWTON, IOWA, ASSIGNOR FOR ONE-HALF HIS RIGHT TO F. W. COZAD, OF SAME PLACE.

Letters Patent No. 100,117, dated February 22, 1870.

IMPROVEMENT IN PORTABLE FURNACES.

The Schedule referred to in these Letters Patent and making part of the same.

I, THOMAS CHADWICK, of Newton, in the county of Jasper, and State of Iowa, have invented certain Improvements in a Fire-Pot for Cooking and other household purposes, of which the following is a specification.

My invention relates to a fire-pot which may be made of cast-iron or other material, for temporary use, (more especially in summer,) when it is not desired to make a fire in the stove itself, and is made of such a shape as to fit in one of the top holes of any stove after removing the cover, and can be used for any of the ordinary household purposes for which a fire is used, when a large fire is not needed.

I do not broadly claim a fire-pot, but believe that the simple combination and arrangement of this particular pot is more convenient and better adapted to the purpose than other pots now in use.

A is the frame or body of my pot, made tapering from top downward, so as to fit any stove-hole.

B is a horizontal square ledge, about one inch from the top, and running around its entire circumference, for the purpose of holding the open cover when desired, or for the purpose of supporting any vessel, when desired.

C is a row of circular holes, about one-half inch diameter, and about two inches apart, running entirely around the pot just below the ledge B.

D is two rows of circular holes, about one-half inch diameter, and two inches apart, running entirely around and near the base of the pot.

Figure 1:
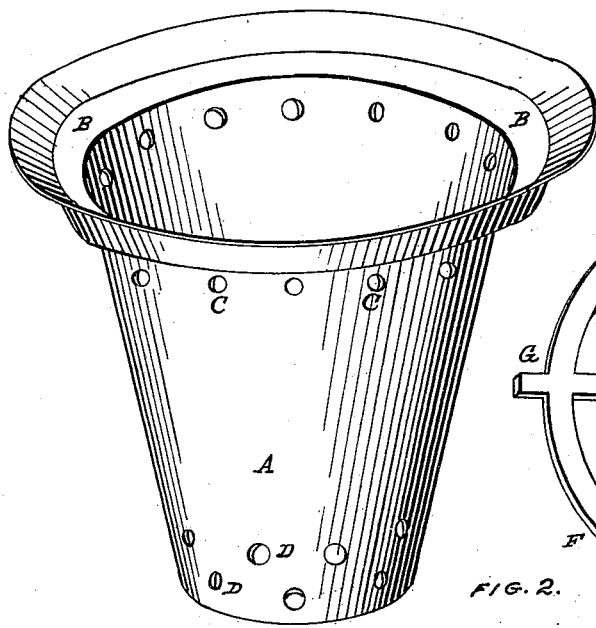
Figure 1 is a side view of a pot embodying my invention.
Figure 2:
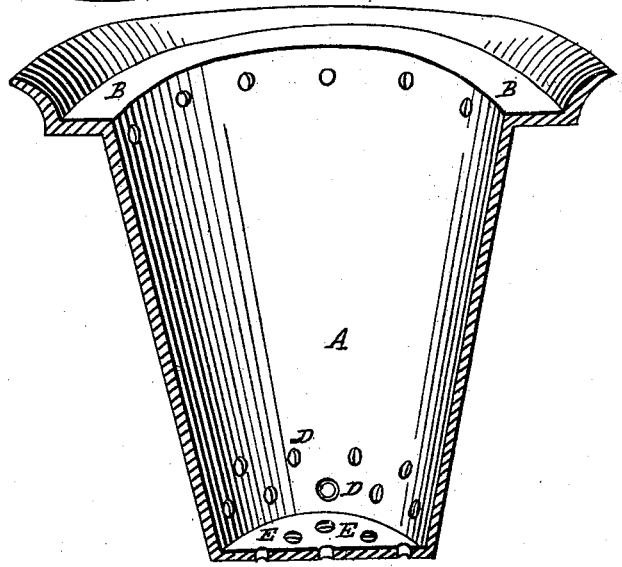
Figure 2 is a sectional view of same, showing holes in the bottom.

E is two rows of circular holes, about the same size and distance apart as the preceding ones, in the bottom of pot, reference being had to figs. 1 and 2.

Figure 3:
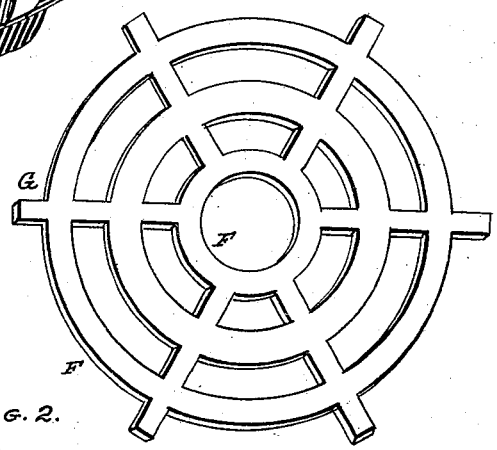
Figure 3 is an open cover to fit the pot.

F and G, fig. 3, are the rings and arms composing the open cover fitting the pot.

The operation of my invention is as follows:

Close up the front part of the stove tight; then remove one of the top covers of the stove and open the damper; insert the fire-pot in the hole from which the cover has been removed, and place inside the pot coal, coke, chips, or other fuel, with a few shavings on top; light the shavings and cover the pot with anything that may be convenient for a few minutes, until combustion takes place. The front of the stove being closed tight, and the outer air entering on top of the fuel through the holes C under the ledge, the draught is downward through the holes in sides and bottom D and E, and up into the stove-pipe or chimney, causing the fuel to be rapidly ignited from top to bottom of the pot, when the cover may be removed, and the fire used for any purpose.

The advantages of my pot are:

First, its extreme simplicity.

Second, by the arrangement of the holes under the ledge, in connection with the holes in the bottom and around the lower part of the pot, makes the draught downward, even when the whole top of the pot is covered by a vessel, and the smoke all carried off up the stove-pipe and into the chimney.

Third, the arrangement of the open cover, composed of two, three, or more rings F, with arms G extending outside the outer ring, for the purpose of supporting it solidly on the ledge B, makes a very desirable place for broiling meat, heating flat irons, or supporting a vessel, while it does not materially obstruct the direct heat of the fire.

Claim.

What I claim, and desire to secure by Letters Patent, is—

The combination of the tapering pot A, with its upper flange and ledge B, perforations C D E, and removable open cover F, which rests on the ledge B, whereby a draught is had through the perforations under the ledge down through and out the bottom of the pot, substantially as herein set forth.

THOS. CHADWICK.

Witnesses:
J. P. DRIVER,
J. L. HUSBAND.